(12) United States Patent
Katou et al.

(10) Patent No.: US 8,242,366 B2
(45) Date of Patent: Aug. 14, 2012

(54) POWER SUPPLYING SYSTEM FOR A SLIDING STRUCTURE

(75) Inventors: Mitsunobu Katou, Kosai (JP); Hiroshi Yamashita, Kosai (JP); Tomoaki Nishimura, Kariya (JP); Motonari Inagaki, Kariya (JP)

(73) Assignees: Yazaki Corporation, Tokyo (JP); Aisin Seiki Kabushiki Kaisha, Aichi (JP)

( * ) Notice: Subject to any disclaimer, the term of this patent is extended or adjusted under 35 U.S.C. 154(b) by 228 days.

(21) Appl. No.: 12/723,962

(22) Filed: Mar. 15, 2010

(65) Prior Publication Data

US 2010/0243317 A1   Sep. 30, 2010

(30) Foreign Application Priority Data

Mar. 30, 2009  (JP) ................. 2009-081196

(51) Int. Cl.
*H02G 3/04* (2006.01)

(52) U.S. Cl. .......... 174/72 A; 174/68.1; 174/69; 174/97; 439/502; 211/26; 361/826; 248/49

(58) Field of Classification Search .............. 174/72 A, 174/68.1, 68.3, 69, 97; 439/501, 502; 248/49, 248/629; 361/826; 211/26
See application file for complete search history.

(56) References Cited

U.S. PATENT DOCUMENTS

| 7,534,959 | B2 * | 5/2009 | Kogure et al. | 174/72 A |
| 7,729,132 | B2 * | 6/2010 | Yamamoto et al. | 361/826 |
| 7,854,413 | B2 * | 12/2010 | Yamamoto et al. | 248/49 |
| 2008/0128232 | A1 | 6/2008 | Aoki et al. | |
| 2009/0095858 | A1 | 4/2009 | Katou et al. | |
| 2009/0223132 | A1 | 9/2009 | Aoki et al. | |

FOREIGN PATENT DOCUMENTS

| EP | 2 081 270 A1 | 7/2009 |
| JP | 2008-113510 A | 5/2008 |
| JP | 2008-148539 A | 6/2008 |
| JP | 2009-065814 A | 3/2009 |

* cited by examiner

*Primary Examiner* — Dhirubhai R Patel
(74) *Attorney, Agent, or Firm* — Sughrue Mion, PLLC

(57) ABSTRACT

A link arm is rotatably supported by a rotating shaft along a protector base, and urged in a harness-slack-absorbing direction by a torsion coil spring. A wiring harness is fixed to a harness-holding member at a tip end of the link arm and to a harness-fixing portion of the protector base, and routed flexibly between the harness-holding member and the harness-fixing portion via between the protector base and an opposite wall of the link arm opposite to the protector base.

4 Claims, 4 Drawing Sheets

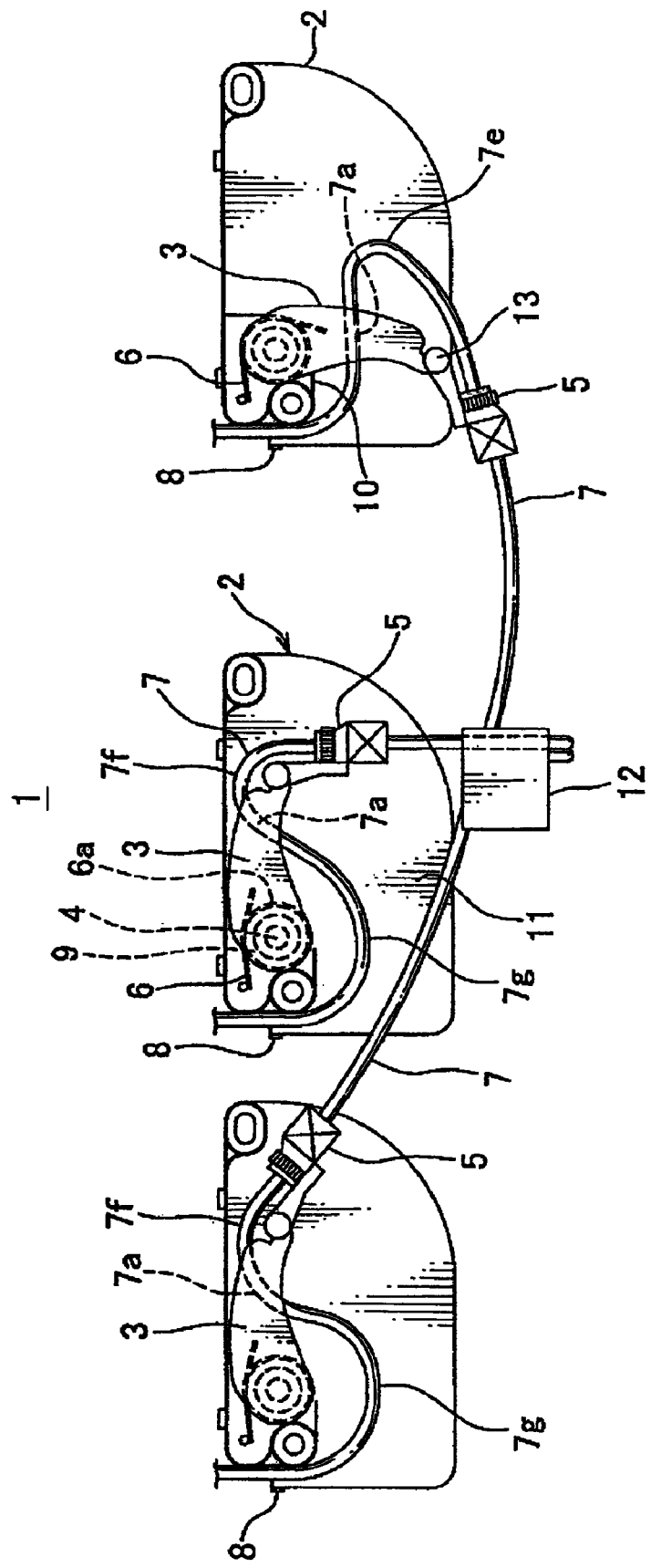

POWER SUPPLYING SYSTEM FOR A SLIDING STRUCTURE

CROSS REFERENCE TO RELATED APPLICATIONS

This application is on the basis of Japanese Patent Application No. 2009-081196, the contents of which are hereby incorporated by reference.

BACKGROUND OF THE INVENTION

1. Field of the Invention

The present invention relates to a power-supplying system for a sliding structure in which a wiring harness is routed along a link arm for continuously supplying electric power to such as a sliding door of a vehicle.

2. Description of the Related Art

FIG. 7 shows an embodiment of a conventional power-supplying system for a sliding structure (See Patent Document 1).

In this power-supplying system 41, a link arm 43 is pivotally supported in a synthetic resin made protector 42 at a sliding door side of a vehicle, and a metallic torsion coil spring 44 is attached to a shaft 50 of the link arm 43. The link arm 43 is urged upward by the coil spring 44. A harness holder 45 is provided at a tip end of the link arm 43. The wiring harness 46 is extended from a harness fixed portion 47 at a front end of the protector 42 along a surface of the link arm 43 to the harness holder 45, and further extended from the harness holder 45 via an oblong lower opening 48 of the protector 42 to a harness fixed portion 49. The protector 42 is composed of a base 42a and a cover 42b.

FIG. 7 shows a sliding door at a left side of a vehicle in a full open state by sliding forward. When the sliding door is half open, the wiring harness 46 is nearly slack between the sliding door and a vehicle body. However, the link arm 43 is rotated upward due to the urging force of the coil spring 44 to absorb a slack of the wiring harness 46. When the sliding door is fully open by sliding backward, the wiring harness 46 is pulled forward around the harness fixed portion 49, and the link arm 43 is rotated downward against the urging force of the coil spring 44.

[Patent Document 1] Japanese Published Patent Application No. 2008-148539 (FIG. 8(c))

However, as shown in FIG. 8, in the conventional system 41, the wiring harness 46 is swung largely in a thickness direction of the protector 42. In particular, if the protector cover 42b is absent, the wiring harness 46 may interfere with other parts at an outside to generate noise, or may malfunction to reduce harness-slack-absorbing performance.

These problems may happen in not only a sliding door of a vehicle, but also a sliding door or the like of the other machines. These sliding doors or the like are referred to as a sliding structure, and a vehicle body or the like is referred to as a fixing structure.

Accordingly, an object of the present invention is to provide a power-supplying system for a sliding structure which prevents the wiring harness in a protector from swinging upward in a thickness direction of a link arm to maintain harness-slack-absorbing performance.

SUMMARY OF THE INVENTION

In order to attain the object, according to the present invention, there is provided a power-supplying system for a sliding structure including:

a link arm rotatably supported by a rotating shaft along a protector base, and urged in a harness-slack-absorbing direction by a torsion coil spring; and a wiring harness fixed to a harness-holding member at a tip end of the link arm and to a harness-fixing portion of the protector base, and routed flexibly between the harness-holding member and the harness-fixing portion via between the protector base and an opposite wall of the link arm opposite to the protector base.

These and other objects, features, and advantages of the present invention will become more apparent upon reading of the following detailed description along with the accompanied drawings.

BRIEF DESCRIPTION OF THE DRAWINGS

FIG. 1 is a front view showing three operating modes of a first embodiment of a power-supplying system for a sliding structure according to the present invention;

DETAILED DESCRIPTION OF THE PREFERRED EMBODIMENTS

FIG. 1 is a front view showing a first embodiment of power-supplying system for a sliding structure according to the present invention.

Figure 7:
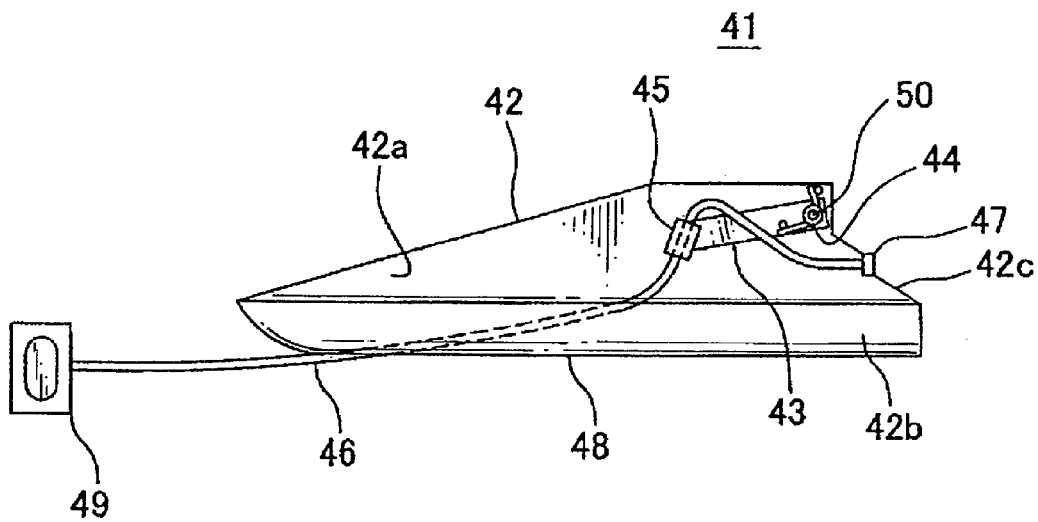
FIG. 7 is a front view showing an embodiment of a conventional power-supplying system for a sliding structure.
Figure 8:
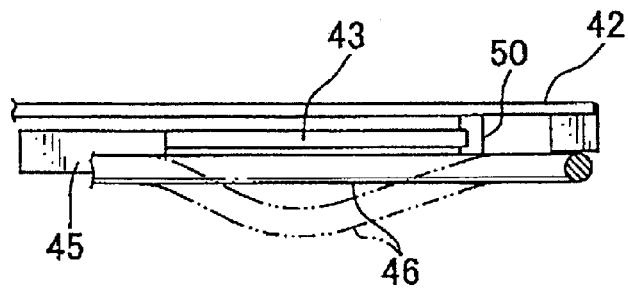
FIG. 8 is a front view showing a problem of the conventional power-supplying system.

In FIG. 1, a right side view shows a power-supplying system of a right-side sliding door (not shown) of a vehicle as a sliding structure in a full-open state, a center view shows the power-supplying system of the sliding door in a half-open state, and a left side view shows the power-supplying system of the sliding door in a fully-closed state. Incidentally, as shown in FIG. 7, when the power-supplying system is mounted on a left-side sliding door, the operating modes are inverted from FIG. 1.

A first feature of this power-supplying system 1 is that a synthetic resin-made or metallic link arm 3 is rotatably mounted on a synthetic resin-made protector base 2 with a rotating shaft 4, a harness holding member 5 is rotatably mounted on a tip end of the link arm 3, a metallic torsion coil spring 6 urges the link arm 3 upward in a counter-clockwise direction, and a wiring harness 7 is routed from a harness-fixing portion 8 at a front end of the protector base 2 via a rear wall of the link arm 3 to the harness holding member 5.

Further, a second feature of this power-supplying system 1 is that a large circular wall 9 is disposed at an outside of the rotating shaft 4 of the link arm 3, and a coil winding portion 6a of the torsion coil spring 6 is attached to an outer periphery of the circular wall 9.

Further, a third feature of this power-supplying system 1 is that a stopper 10 is mounted on the protector base 2 for preventing an excessive rotation of the link arm 3 when the sliding door (not shown) is full-open state as shown in the right side view in FIG. 1, and the link arm 3 is rotated in the counter-clockwise direction against urging force of the torsion coil spring 6.

Figure 2A:
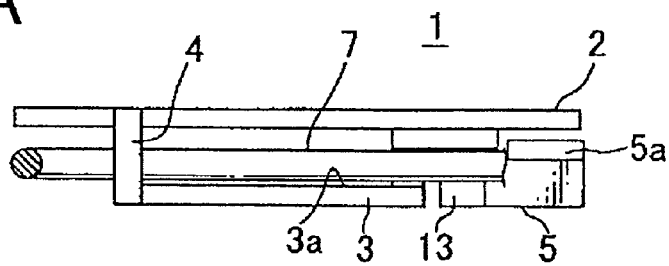
FIG. 2A is a plan view showing a first essential part of the power-supplying system.
Figure 2B:
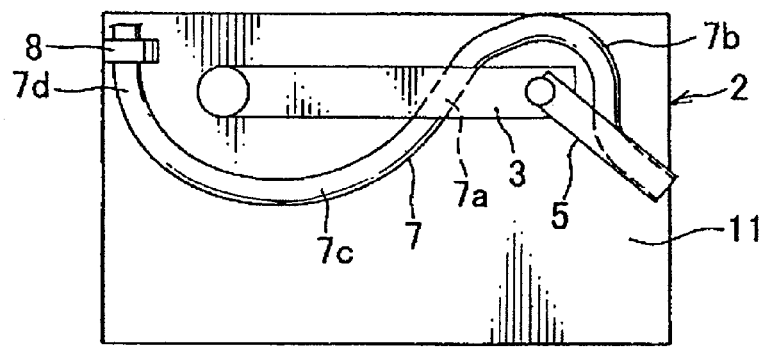
FIG. 2B is a front view showing the first essential part of the power-supplying system.

Regarding the first feature, as shown in FIGS. 2A and 2B, the link arm 3 is arranged parallel to a vertical substrate 11 of the protector base 2, the wiring harness 7 is inserted into between the substrate 11 and a rear wall 3a (opposed to the protector base 2) of the link arm 3 (In FIG. 2B, the harness portion at the rear wall 3a is indicated by a mark 7a), and the link arm 3 prevents the wiring harness 7 from moving out in a thickness direction of the link arm 3 (a thickness direction of the protector base 2).

Therefore, an interfering noise with a protector cover (not shown) due to a swing of the wiring harness 7 is prevented. Further, when the protector cover is not used, an interference with an outside, a noise caused by the interference, an abrasion or a damage of the wiring harness 7, a failure of slack absorption of the wiring harness 7 are prevented.

As shown in a plan view of FIG. 2A, the wiring harness 7 is routed substantially straight (without bending in the thickness direction of the link arm 3) from the harness holding member 5 along the rear wall 3a of the link arm 3, and extended upward to the harness-fixing portion 8 of the protector base 2 via a lower side of the link arm 3.

As shown in a front view of FIG. 2B, the wiring harness 7 is curved upward in a substantially arc shape (an upward curved portion is indicated by a mark 7b) with a small radius from the harness holding member 5, passed through a rear side of the substantially horizontal link arm 3, and curved downward in a substantially arc shape (a downward curved portion is indicated by a mark 7c) with a large radius. A harness rising part 7d is fixed to the harness-fixing portion 8 of the protector base 2 with a band or the like.

It is preferable for increasing flexibility that the wiring harness 7 routed along the protector base 2 in FIG. 2 is composed of a plurality of electric wires covered by flexible synthetic resin-made mesh tube or the like. It is preferable that at a wide portion 5a at the tip end side of the harness holding member 5, the electric wires are covered by a synthetic resin-made corrugate tube (a harness protection tube formed of ridges and grooves alternately), and routed to a harness-fixing part 12 at a vehicle body side shown in FIG. 1.

In an embodiment shown in FIG. 1, the protector is solely composed of the protector base 2. When using the protector cover (not shown), a skirt portion of the protector cover is shorter than the protector base 2, and the harness holding member 5 is exposed to an outside of the protector cover. An oblong opening (not shown) is formed between the substrate 11 of the protector base 2 and the skirt portion of the protector cover.

As shown in the right side view of FIG. 1, when the sliding door is in the full-open state, the wiring harness 7 is pulled forward toward the harness-fixing part 12 at the vehicle body side, the link arm 3 is rotated substantially vertically downward, and the harness holding member 5 is rotated around a hinge shaft 13 at the tip end of the link arm 3 anterior to the link arm 3.

The wiring harness 7 is curved obliquely backward and upward from the harness holding member 5 (a curved portion of the wiring harness 7 is indicated by a mark 7e), passed across the rear side of the link arm 3 along the protector base 2 (a portion of the wiring harness 7 at the rear side of the link arm 3 is indicated by a mark 7a), extended vertically at a front end of the protector base 2, continued to the harness-fixing portion 8, routed from the harness-fixing portion 8 to the sliding door side, and connected to an auxiliary machine or the like (not shown) in the sliding door.

As shown in the center view of FIG. 1, when the sliding door is in the half-open state, the link arm 3 is rotated upward to a horizontal position in the counter-clockwise direction by the urging force of the torsion coil spring 6, the harness holding member 5 hangs down vertically from the link arm 3 and lifts the wiring harness 7 substantially vertically to absorb the slack of the wiring harness 7. Thus, the harness slack is prevented.

The wiring harness 7 is curved upward from the harness holding member 5 (a curved portion of the wiring harness 7 is indicated by a mark 7f), passed through the rear side of the link arm 3 (the portion of the wiring harness 7 at the rear side of the link arm 3 is indicated by the mark 7a), curved downward in a large radius (the curved portion is indicated by a mark 7g), and continued upward to the harness-fixing portion 8.

As shown in the left side view of FIG. 1, when the sliding door is in the fully-closed state, the wiring harness 7 is pulled backward to the harness-fixing part 12 at the vehicle body side, the link arm 3 is rotated a little downward, and the harness holding member 5 is positioned obliquely backward and downward. The wiring harness 7 is curved upward from the harness holding member 5 (the curved portion of the wiring harness 7 is indicated by the mark 7f), passed through the rear side of the link arm 3 (the portion of the wiring harness 7 at the rear side of the link arm 3 is indicated by the mark 7a), curved downward (the curved portion is indicated by the mark 7g), and continued upward to the harness-fixing portion 8.

Figure 3:
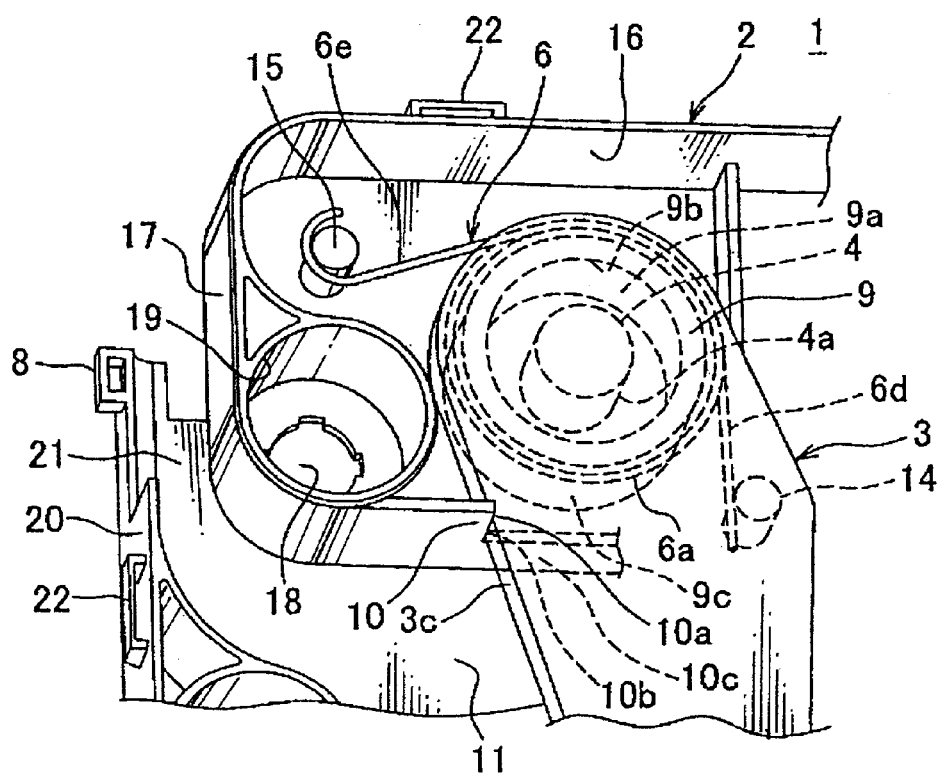
FIG. 3 is a perspective view showing second and third essential part of the power supplying system.
Figure 4:
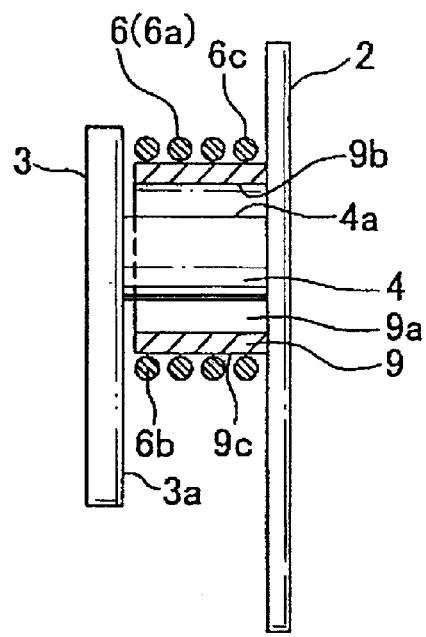
FIG. 4 is a vertical sectional view showing the second essential part.

Regarding the second feature, as shown in FIGS. 3 and 4, the rotating shaft 4 with a small radius is integrally projected from the link arm 3, the circular wall 9 with a large radius is integrally projected from the protector base 2 at an outside of the rotating shaft 4, and the circular wall 9 coaxially surrounds the rotating shaft 4 in an inner space 9a of the circular wall 9.

Figure 5:
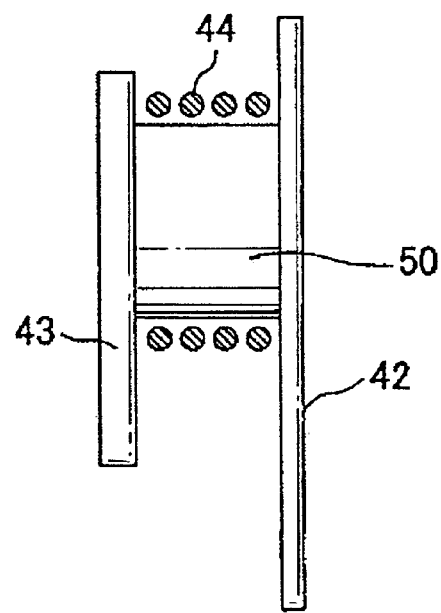
FIG. 5 is a vertical sectional view explaining a problem with the conventional link arm without the second essential part.

FIG. 5 shows an urging structure of the conventional link arm 43 of FIG. 7. Because a winding portion of the torsion coil spring 44 is disposed on an outer periphery of the rotating shaft 50, when the link arm 43 is rotated, a radius of the winding portion of the torsion coil spring 44 is decreased, and the torsion coil spring 44 presses the rotating shaft 50 strongly to generate large frictional resistance. Thereby, for example, operating force to open the sliding door may be increased. Further, when the sliding door is to be closed, the urging force of the torsion coil spring 44 is decreased due to the frictional resistance, so that the harness slack absorbing performance may be decreased. However, according to the second feature of the present invention, the torsion coil spring 6 is prevented from pressing strongly the rotating shaft 4 of the link arm 3, so that good harness slack absorbing performance is maintained.

For example, the rotating shaft 4 may includes a circular hole (not shown) into which a small shaft (not shown) having a circular section integrally projected from a surface of the substrate 11 of the protector base 2 is inserted. An inner periphery of the hole (not shown) is in sliding contact with an outer periphery of the small shaft (not shown), and thereby the rotating shaft 4 is rotatably supported by the protector base 2. For example, the hole (not shown) penetrating the link arm 3, continued to a hole (not shown) of the link arm 3 via a surface of the link arm 3 fixes a bolt or the like (not shown) having a large head for preventing from falling out onto the small shaft (not shown). Alternatively, a through hole may be formed on the small shaft (not shown), and the bolt or the like may rotatably support the rotating shaft 4 of the link arm 3 from a rear side of the protector base 2.

In an embodiment shown in FIG. 4, the rotating shaft 4 of the link arm 3 is much smaller than the circular wall 9 of the circular wall 9, and the inner space 9a is provided between the rotating shaft 4 and the circular wall 9. However, an outer radius of the rotating shaft 4 may be a little smaller than an inner radius of the circular wall 9, and an outer periphery 4a of the rotating shaft 4 may be in sliding contact with an inner periphery 9b of the circular wall 9.

As shown in FIG. 4, it is preferable that an inner periphery of the winding portion 6a of the torsion coil spring 6 comes close to an outer periphery 9c of the circular wall 9, and a winding end 6b at the link arm 3 side of the winding portion 6a is not in contact with the rear wall 3a of the link arm 3. As shown in FIG. 3, a rod portion 6d of the torsion coil spring 6 is extended in a tangential direction of the torsion coil spring 6 from the winding end 6b, and engaged with a spring receiver 14 projected from the link arm 3 at an outside (obliquely backward and downward) of the circular wall 9. The other rod portion 6e of the torsion coil spring 6 is extended in the tangential direction from the other winding end 6c (shown in FIG. 4) of the winding portion 6a, and engaged with a spring receiver 15 projected from the protector base 2 at an outside (forward and upward) of the circular wall 9.

In FIG. 3 (corresponding to the right side view in FIG. 1), the one rod 6d is twisted in a clockwise direction around the other rod 6e against the urging force of the torsion coil spring 6, and a radius of the winding portion 6a is reduced so that the winding portion 6a presses strongly the outer periphery 9c of the circular wall 9. However, because the rotating shaft 4 of the link arm 3 is disposed inside of the circular wall 9, an increase of the friction resistance at the winding portion 6a does not affect the rotating shaft 4.

Regarding the third feature, as shown in FIG. 3, when the link arm 3 is rotated in the clockwise direction, a side wall 3c at a front side of a base end of the link arm 3 comes in contact with a stopper wall 10 of the protector base 2, and further rotation is prevented.

According to the conventional embodiment shown in FIG. 7, when the protector 42 is moved backward (left side in FIG. 7) and the sliding door becomes the full-open state, the link arm 43 is rotated in the counter-clockwise direction, so that the link arm 43 may interfere with other parts (not shown) near a front end 42c of the protector 42. Further, when the sliding door is rapidly open, the torsion coil spring 44 may be plastically deformed, and spring force may be reduced, there by the harness slack absorbing performance may be reduced. However, according to the third feature of the present invention, an excessive rotation of the link arm 3 against the urging force of the torsion coil spring 6 is prevented, and good harness slack absorbing performance is maintained.

Figure 6:
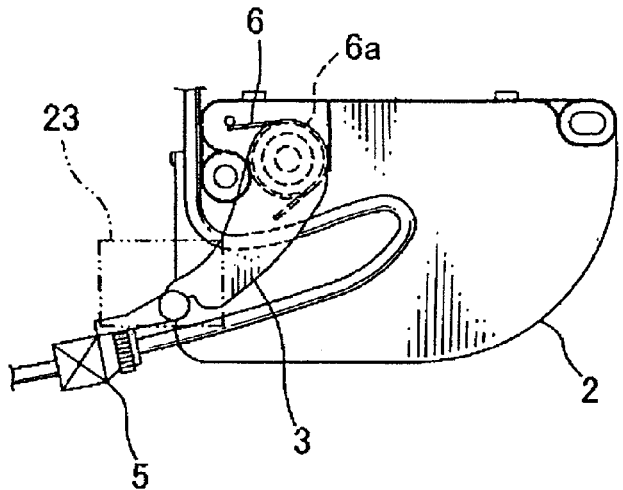
FIG. 6 is a front view explaining a problem with the conventional link arm without the third essential part.

As shown in FIG. 6, if the stopper wall 10 is not provided, when the sliding door is fully open (in particular, rapidly open the door), the link arm 3 is widely rotated forward in the clockwise direction, and the harness holding member 5 is projected forward from the protector base 2 along the link arm 3, and interferes with other structure 23 at a front side of the protector base 2. Further, the torsion coil spring 6 is strongly twisted in a direction of decreasing the radius of the torsion coil spring 6 and may be plastically deformed, thereby spring force of the torsion coil spring 6 may be decreased, and the harness slack absorbing performance may be decreased.

As shown in FIG. 3, when the stopper wall 10 prevents the excessive rotation of the link arm 3, the interference between the link arm 3 and the other structure 23 is prevented, and the decrease of the spring force of the torsion coil spring 6 is prevented, thereby the decrease of the harness slack absorbing performance is prevented.

As shown in FIG. 3, the stopper wall 10 is a part of a wall 17 in substantially a C-shape continued from an upper end wall 16 as a peripheral wall of the protector base 2. The stopper wall 10 is parallel to the upper end wall 16. A hole 18 for fixing the protector base 2 onto the sliding door (not shown), and a circular protecting wall 19 around the hole 18 are provided at an upper side of the stopper wall 10. The spring receiver 15 is disposed at an upper side of the protecting wall 19. The circular wall 9 is disposed at an obliquely backward and upward side of the stopper wall 10.

A harness guiding path 21 is formed between the wall 17 and a front end wall 20. The harness-fixing portion 8 is formed at a top end of the harness guiding path 21. The stopper wall 10 also prevents the wiring harness 7 from moving back toward the torsion coil spring 6.

The stopper wall 10 includes: an abutting wall 10a and a step 10b. A portion 10c of the step 10b extending along the substrate 11 is continued to a rear side of the link arm 3, and guides the link arm 3 to prevent the link arm 3 from moving toward the substrate 11 in a thickness direction of the link arm 3. Frame portions (engaging members) 22 for engaging with locking claws of the protector cover (not shown) are formed on the upper end wall 16 and the front end wall 20.

Incidentally, in this embodiment, the harness holding member 5 is rotatably provided on the link arm 3. However, the harness holding member 5 can be fixed to the link arm 3. In this case, preferably, the harness holding member 5 is bent in substantially an L-shape together with the link arm 3.

Further, the structure of this embodiment is used not only as the power-supplying system for a sliding structure, but also as a harness routing structure of the power-supplying system, and as a harness routing structure of the sliding structure.

The power-supplying system for a sliding structure according to this invention is used in a sliding door or a sliding part of a vehicle or the like.

Preferably, the rotating shaft of the link arm is surrounded by a circular wall mounted on the protector base, and a winding portion of the torsion coil spring is disposed along an outer periphery of the circular wall.

Preferably, the power-supplying system further includes a stopper provided on the protector base for preventing an excessive rotation of the link arm against an urging force of the torsion coil spring.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A power-supplying system for a sliding structure comprising:
a link arm rotatably supported by a rotating shaft along a protector base, and urged in a harness-slack-absorbing direction by a spring; and
a wiring harness fixed to a harness-holding member at a tip end of the link arm and to a harness-fixing portion of the protector base, and routed flexibly between the harness-holding member and the harness-fixing portion via between the protector base and an opposite wall of the link arm opposite to the protector base.

2. The system as claimed in claim 1, wherein the rotating shaft of the link arm is surrounded by a circular wall mounted on the protector base, and a winding portion of the spring is disposed along an outer periphery of the circular wall.

3. The system as claimed in claim 1, further comprising a stopper provided on the protector base for preventing an excessive rotation of the link arm against an urging force of the spring.

4. The system as claimed in claim 1, wherein the spring is a torsion coil spring.

* * * * *